Patented May 21, 1935

2,002,243

UNITED STATES PATENT OFFICE 2,002,243

FORMALDEHYDE SOLUTION

Wilbie Scott Hinegardner, Prince Bay, Staten Island, N. Y., assignor to E. I. du Pont de Nemours & Company, Inc., Wilmington, Del., a corporation of Delaware No Drawing. Application October 24, 1932, Serial No. 639,300

10 Claims. (Cl. 23—250)

This invention relates to the stabilization of aqueous formaldehyde solutions.

Aqueous solutions of substantially pure formaldehyde containing not over 30% of the aldehyde are stable at temperatures of 0° C. and above, i. e. no formaldehyde polymer will precipitate from such solutions at these temperatures. Hence, such a solution, if kept pure, need not be stabilized if it is to be stored and transported at temperatures not below 0° C.

Aqueous solutions of formaldehyde containing much in excess of 30% by weight of formaldehyde, if allowed to stand at temperatures above 0° C. will precipitate formaldehyde polymer, the temperature at which precipitation occurs depending upon the concentration of formaldehyde present. At temperatures below 0° C. precipitation will occur in solutions containing less than 30% of formaldehyde, while at elevated temperatures the formaldehyde concentration may be increased to above 30% before precipitation occurs. The separation of the polymer in case the aqueous formaldehyde solution is kept at a temperature at which it is no longer stable is not instantaneous. The excess formaldehyde, over the amount which is stable, may require from several hours to three or four weeks to separate completely as a polymer.

Heretofore, the precipitation of formaldehyde polymer from aqueous solutions such as the common 37% concentration has been prevented by the addition of methanol or ethanol. The stabilizing effect of these alcohols is rather mild and a considerable quantity must be added to prevent precipitation. Thus 10–12% by weight of methanol is required to stabilize, i. e. prevent polymer precipitation from, the commercial 37% or U. S. P. grade of formaldehyde at 0°–5° C. One of the disadvantages of this is seen when formaldehyde containing methanol is used, for instance in the manufacture of artificial resins, for here the methanol is of no use and is wasted.

An object of this invention is to stabilize formaldehyde solutions against polymer precipitation by the use of other stabilizers than have been used heretofore and particularly to effect this stabilization with smaller amounts of stabilizer. A further object is to produce stable formaldehyde solutions especially useful for manufacture of artificial resins. My invention also includes the novel and more useful products obtained by my method of stabilization.

I have discovered that these objects may be accomplished by adding hydrogen sulfide to aqueous formaldehyde solutions.

As noted above, at a given temperature there is a limiting concentration of formaldehyde in unstabilized solutions; if the concentration is increased beyond this limiting value, paraform will precipitate. This limiting concentration varies inversely with the temperature; hence, a solution stable at 20° C. may be unstable at 0° C. or lower. In other words, as the temperature is lowered below the point of stability the amount of formaldehyde available for paraform formation is increased. I believe that hydrogen sulfide and possibly other formaldehyde stabilizers function by reacting reversibly with the formaldehyde available for paraform formation to form water soluble compounds. Hence, the amount of hydrogen sulfide required to stabilize depends on the formaldehyde concentration and the temperature to which the solution is to be exposed. The minimum amount of hydrogen sulfide required may be readily determined by simple tests.

An excess of hydrogen sulfide over that required to stabilize ordinarily is not detrimental; I prefer to employ a small excess; for instance, I may add 5–10% by weight of hydrogen sulfide to a 37% formaldehyde solution which is to be exposed to temperatures as low as 5° C. However, saturation or near saturation of the solution with hydrogen sulfide, should be avoided, for then a sulfur compound of formaldehyde may be precipitated. The stabilizing effect of hydrogen sulfide is not appreciably affected by small changes in acidity, provided the solution is not made either strongly acidic or strongly basic. My stabilizer is effective in the pH range of 2–8. The stabilizing effect occurs practically instantaneously on addition of the hydrogen sulfide.

My improved stabilizer may be used to increase the stability of a solution which has already been partially stabilized by means of methyl or ethyl alcohol. For example, I have found that when both methanol and hydrogen sulfide are added to the same solution, each acts independently to prevent precipitation of polymer. Hence, less of my stabilizer is required to stabilize a solution containing methyl or ethyl alcohol than is necessary to stabilize an alcohol-free solution to the same extent.

The stabilizing effect of hydrogen sulfide is illustrated by the following example:

Example

A number of samples of a 37% U. S. P. aqueous formaldehyde solution were prepared, containing 0.5% of methanol. Varying amounts of hydrogen sulfide were dissolved in some samples;

around 10-12% of methanol was added to other samples. The samples were then stored together in a refrigerator at a temperature of 6-9° C. and were periodically examined for the formation of precipitates. The results are shown in the following table:

| Sample | Per cent by wt. of $H_2S$ | Per cent by wt. of methanol | Observations |
|---|---|---|---|
| A | 7.98 | 0.5 | No precipitate after 38 days. |
| B | 5.66 | 0.5 | Do. |
| C | none | 10.0 | Slight precipitate after 18 days; heavy precipitate after 38 days. |
| D | none | 12.0 | No precipitate after 38 days. |
| E | none | 0.5 | Heavy precipitate after 3 days. |

An advantage of hydrogen sulfide as formaldehyde stabilizer is seen in the fact that it is more effective and may be used in smaller amounts than stabilizers heretofore proposed or used. In the preparation of U. S. P. formaldehyde solutions it has been necessary heretofore to have present 10-15% of methanol or ethyl alcohol as stabilizer to prevent polymer precipitation at temperatures as low as 5-10°. According to my invention, these alcohols may be replaced by a smaller amount of the relatively inexpensive hydrogen sulfide.

It is understood that when I refer to an aqueous solution of formaldehyde in this specification and in the appended claims, I mean to include solutions which contain alcohols or other stabilizers other than hydrogen sulfide or other impure formaldehyde solutions, as well as substantially pure formaldehyde solutions.

I claim:

1. A method of preventing polymer precipitation in an aqueous formaldehyde solution which comprises adding to said aqueous formaldehyde solution hydrogen sulfide in an amount insufficient to cause precipitation therein.

2. A method for preventing polymer precipitation in an aqueous formaldehyde solution comprising adding thereto stabilizing amounts of hydrogen sulfide.

3. A method for preventing polymer precipitation in an aqueous formaldehyde solution which comprises adding to said solution hydrogen sulfide in an amount sufficient to react with the formaldehyde available for paraform precipitation and insufficient to react with the formaldehyde with the formation of a precipitate.

4. A method for preventing polymer precipitation in an aqueous formaldehyde solution which comprises adding thereto an amount of hydrogen sulfide equivalent to 5 to 10% by weight of said aqueous formaldehyde solution.

5. A composition of matter comprising an aqueous solution of formaldehyde to which hydrogen sulfide has been added in an amount insufficient to cause precipitation therein.

6. A composition of matter comprising an aqueous solution of formaldehyde and stabilizing amounts of hydrogen sulfide.

7. A composition of matter comprising an aqueous solution of formaldehyde to which hydrogen sulfide has been added in an amount sufficient to react with the formaldehyde available for paraform formation but insufficient to cause the formation of a precipitate in said aqueous formaldehyde solution.

8. A composition of matter comprising an aqueous solution containing 30 to 37% by weight of formaldehyde to which solution hydrogen sulfide has been added in an amount insufficient to cause precipitation therein.

9. A composition of matter comprising an aqueous solution containing 30-37% by weight of formaldehyde and hydrogen sulfide in amounts sufficient to react with the formaldehyde available for paraform formation.

10. A composition of matter comprising an aqueous solution containing 30 to 37% by weight of formaldehyde, and hydrogen sulfide in an amount equivalent to 5 to 10% by weight of said solution.

WILBIE SCOTT HINEGARDNER.